Nov. 21, 1967 T. M. CORRY ETAL 3,354,370
ELECTRICAL INVERTER HAVING SEPARATE SHUTOFF POWER SUPPLIES
Filed May 20, 1965 2 Sheets-Sheet 1

INVENTORS
Thomas M. Corry
Richard W. Johnston
BY
C. R. Meland
THEIR ATTORNEY

INVENTORS
Thomas M. Corry
Richard W. Johnston
BY
C. R. Meland
THEIR ATTORNEY

United States Patent Office 3,354,370
Patented Nov. 21, 1967

3,354,370
ELECTRICAL INVERTER HAVING SEPARATE
SHUTOFF POWER SUPPLIES
Thomas M. Corry, Goleta, and Richard W. Johnston, Santa Barbara, Calif., assignors to General Motors Corporation, Detroit, Mich., a corporation of Delaware
Filed May 20, 1965, Ser. No. 457,386
5 Claims. (Cl. 318—227)

ABSTRACT OF THE DISCLOSURE

This invention relates to an inverter for supplying alternating current to an electric load such as a polyphase motor from a source of direct current. The inverter utilizes a bridge circuit comprised of a plurality of power controlled rectifiers which feed the polyphase load. The inverter also includes a plurality of shutoff controlled rectifiers for discharging a commutating capacitor to periodically turn off a given power controlled rectifier. The discharge circuit for the commutating capacitor includes a series connected inductor and diode and these elements also carry reactive current where the electrical load is inductive and when a power controlled rectifier is turned off.

This invention relates to an inverter and more particularly to an inverter that can be used to supply a three phase induction motor.

This application is an improvement of the inverter disclosed and claimed in copending application S.N. 457,367 filed on May 20, 1965 and assigned to the assignee of this invention.

One of the objects of this invention is to provide a controlled rectifier inverter with means for eliminating high positive voltage spikes that are applied to the controlled rectifiers in conventional inverters when the commutating capacitors are discharged.

Another object of this invention is to provide a controlled rectifier inverter wherein high reverse voltage spikes are not permitted to appear across the controlled rectifiers.

Another object of this invention is to provide a controlled rectifier inverter wherein reactive return controlled rectifiers are not required and are replaced by a diode-inductor combination that improves the efficiency of the commutating capacitor charge and discharge circuit. An inverter employing reactive return controlled rectifiers is disclosed in copending application, Ser. No. 295,954, filed on July 18, 1963, now Patent 3,323,032.

Another object of this invention is to provide a controlled rectifier inverter which includes a plurality of diodes for eliminating voltage surges which are due to the collapsing field of the motor winding where the inverter is used to drive a motor.

A further object of this invention is to provide a controlled rectifier inverter which has a high Q commutating the motor is not returned to the main power source.

Still another object of this invention is to provide a controlled rectifier inverter which has a higher utilization of the controlled rectifiers due to the elimination of high voltage spikes.

A further object of this invention is to provide a controlled rectifier inverter which has a high Q commutating circuit.

Another object of this invention is to provide a controlled rectifier inverter which has minimum interphase coupling effects by utilizing a diode clamping action.

Further objects and advantages of the present invention will be apparent from the following description, reference being had to the accompanying drawings wherein preferred embodiments of the present invention are clearly shown.

In the drawings:

FIGURE 3 is a schematic circuit diagram of a modification of the inverter shown in FIGURE 2.

Figure 1:
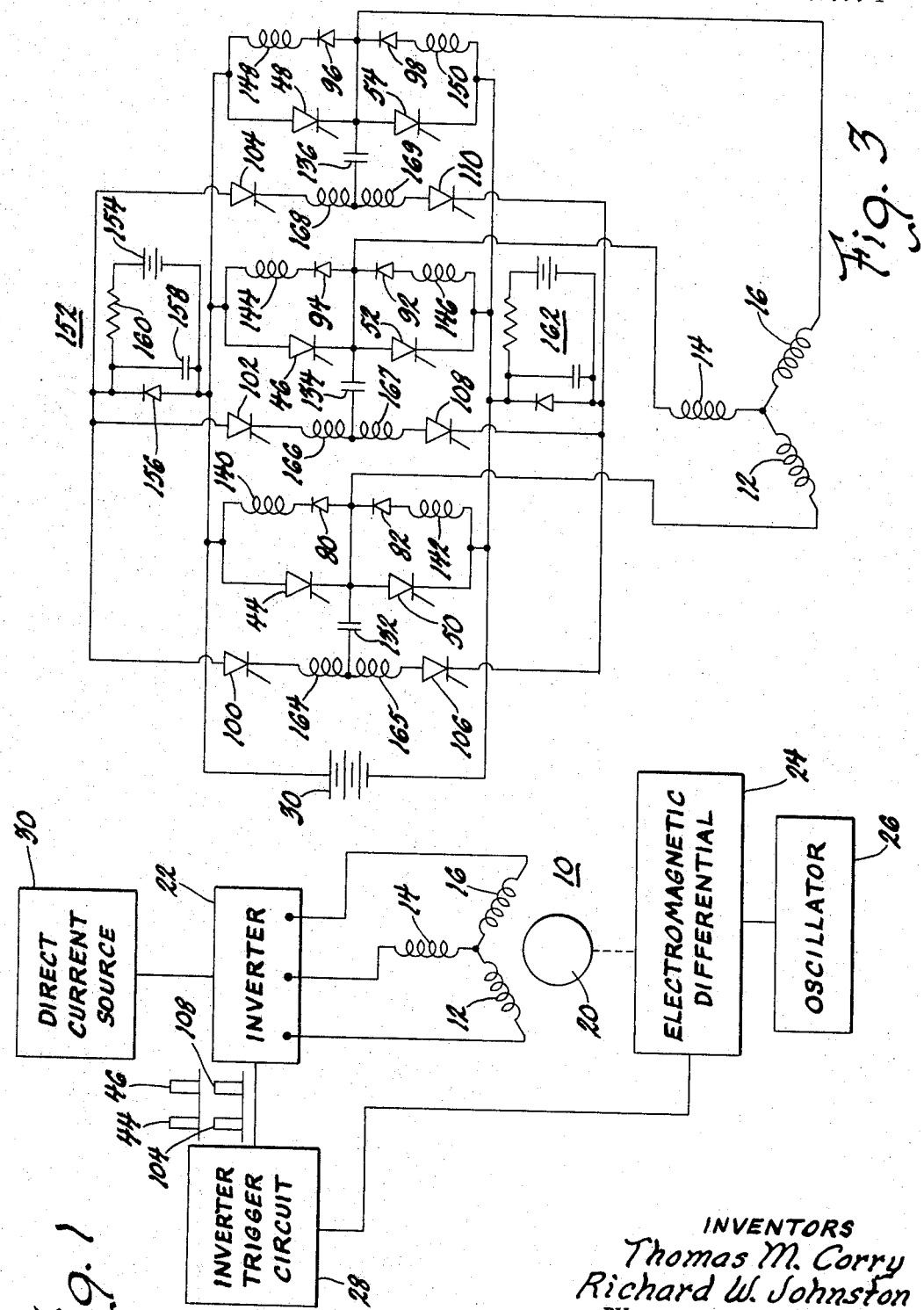
FIGURE 1 is a block diagram of a motor control system that utilizes an inverter made in accordance with this invention.

Referring now to the drawings and more particularly to FIGURE 1, the reference numeral 10 generally designates a three phase Y-connected induction motor having phase windings 12, 14 and 16 and a rotor 20. The phase windings of the motor 10 are fed from the inverter 22 of this invention and the arrangement is such that a rotating field is developed in the stator winding of the induction motor from the output of the inverter. The rotor 20 is coupled to an electromagnetic differential 24. The electromagnetic differential 24 is coupled to an oscillator 26 and has an output which is applied to an inverter trigger circuit 28. The arrangement of the electromagnetic differential 24 and the oscillator 26 is such that the output of the electromagnetic differential is a frequency that is a summation of rotor speed and oscillator frequency. This is more fully described in copending application, Serial No. 295,954, now Patent 3,023,032 mentioned above and is also described in patent application, S.N. 457,329 filed on May 20, 1965, and assigned to the assignee of this invention.

The inverter trigger circuit 28 receives a signal that is a summation of rotor speed and oscillator frequency and controls the inverter accordingly to adjust the frequency of current pulses applied to the phase windings of the motor 10. The inverter is connected with a direct current source 30 which may be controlled in any well known manner. If desired, a pulse modulator can be connected between the source of direct current 30 and the inverter 22.

Figure 2:
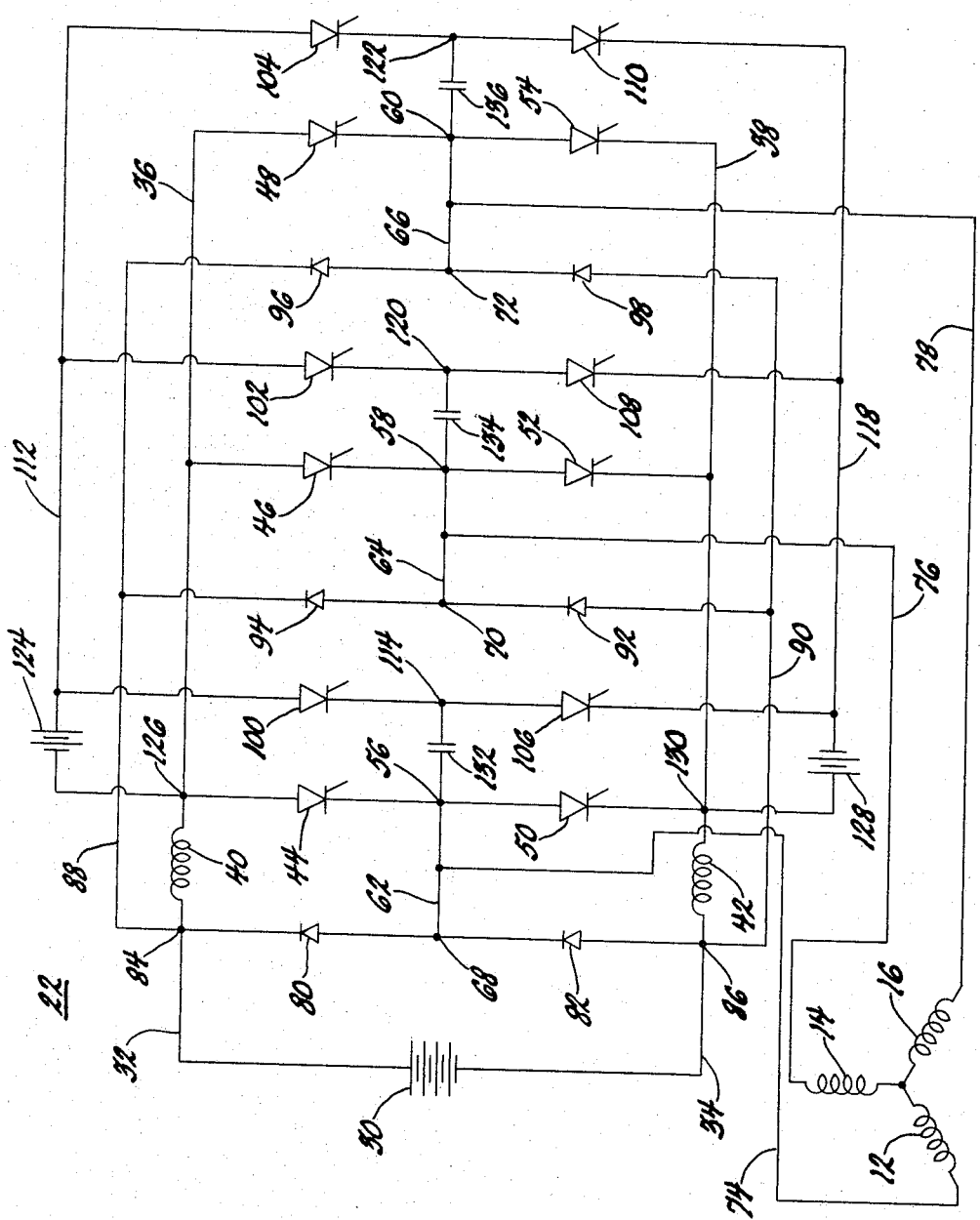
FIGURE 2 is a schematic circuit diagram of an inverter made in accordance with this invention.

Referring now to the drawings and more particularly to FIGURE 2 which illustrates the inverter 22, the source of direct current 30 is connected across power input conductors 32 and 34. The power input conductors are connected with lines 36 and 38 through inductors 40 and 42.

The inverter utilizes six power controlled rectifiers designated respectively by reference numeras 44, 46, 48, 50, 52 and 54. The power controlled rectifiers are connected in series across lines 36 and 38 and have output terminals 56, 58 and 60. The output terminals are connected respectively with conductors 62, 64 and 66 which are connected with junctions 68, 70 and 72. The conductor 62 is connected with phase winding 12 via conductor 74 while conductors 64 and 66 are connected with phase windings 14 and 16 respectively through conductor 76 and 78.

The junction 68 is connected between diodes 80 and 82. The cathode of diode 80 is connected with junction 84 while the anode of diode 82 is connected with junction 86.

The junction 84 is connected with a conductor 88 while the junction 86 is connected with conductor 90. The diodes 92 and 94 are connected across conductors 88 and 90 and with junction 70. A pair of diodes 96 and 98 are connected across conductors 88 and 90 and with the junction 72.

The inverter of FIGURE 2 has six shutoff controlled rectifiers 100, 102, 104, 106, 108 and 110. The shutoff controlled rectifier 100 is connected between conductor 112 and junction 114. The shut-off controlled rectifier 106 is connected between junction 114 and conductor 118. In a similar fashion, shut-off controlled rectifiers 102 and 108 are connected with junction 120 and shut-off controlled rectifiers 104 and 110 are connected with junction 122.

The conductor 112 is connected to one side of a shut-off power supply which takes the form of a direct current source 124. The opposite side of this shut off source 124 is connected with conductor 36 at junction 126. In a similar fashion, the shut-off power supply 128 is connected between conductor 118 and junction 130 on conductor 38.

A plurality of commutating capacitors 132, 134 and 136 are provided. The commutating capacitor 132 is connected between junctions 56 and 114 and similar connections are made for capacitors 134 and 136.

The operating of the inverter shown in FIGURE 2 will now be described. The trigger circuit 28 supplies rectangular pulses to the gate and cathode electrodes of the controlled rectifiers of the inverter of the type illustrated in the above-mentioned copending patent application S.N. 457,367. The sequence of pulses is such as to sequentially turn on pairs of controlled rectifiers to connect pairs of phase windings across the direct current source 30 and this is done in such a sequence that a rotating magnetic field is provided for the motor 10. This sequence of pulses is such that the firing sequence for the power controlled rectifiers is 44, 54, 46, 50, 48, 52, 44 etc. while the firing sequence for the shut-off controlled rectifiers is 104, 108, 100, 110, 102, 106, 104 etc. The leading edges of the firing pulses are sixty electrical degrees apart and the arrangement is such that the pulses for the power controlled rectifiers occur at the same time as the pulses for the shut-off controlled rectifiers. In other words, pulses for controlled rectifiers 44 and 104, and 46 and 108 and so forth begin at the same time. A part of the entire pulse sequence is illustrated in FIGURE 1 and the entire pulse sequence is disclosed in the above-mentioned copending application S.N. 457,367.

In order to facilitate explanation of the operation of the inverter shown in FIGURE 2, let it be assumed that controlled rectifiers 44 and 52 have been triggered to a conductive condition by the trigger pulses coming from trigger circuit 28. When these controlled rectifiers are conductive, current can flow from power source 30, through conductor 32, through inductor 40, through controlled rectifier 44, through conductor 62, through conductor 74, through phase winding 12, through phase winding 14, through conductor 76, through conductor 64, through controlled rectifier 52, through conductor 38, through inductance 42 and then back to the opposite side of the power source through conductor 34. This will energize the phase windings 12 and 14 from the source of direct current and by a periodic sequence of pulses other pairs of controlled rectifiers will be turned on to provide a rotating field for the motor 10.

When it is desired to turn off the controlled rectifier 44, the controlled rectifier 100 is triggered to a conductive condition by shut-off pulses coming from the trigger circuit 28. The shut-off circuit for controlled rectifier 44 can now be traced from charged capacitor 132, through junction 56, through controlled rectifier 44, through shut-off power supply 124 and through controlled rectifier 100. It will be appreciated that the capacitor 132 will discharge through the just described circuit. It will also be appreciated that part of the discharge current from capacitor 132 can flow through conductor 62, through diode 80, through inductance 40, through junction 126, through shut-off power supply 124 and through shut-off controlled rectifier 100.

If the diode 80 were not provided, the voltage at junction 56 with respect to the negative side of the power source would instantly increase to the value of the shut-off voltage, causing a high voltage spike to appear across the controlled rectifiers 50 and 106 which at this time are nonconductive. This is an undesirable condition that may lead to a misfiring of controlled rectifiers 50 and 106 and does make necessary a de-rating of the inverter so that voltage ratings of the controlled rectifiers will not be exceeded were diodes such as diode 80 not used.

In addition, the diode 80 operates to clamp junction 56 to the main power supply 30 during the time that capacitor 132 is discharging and charging. The conduction of diode 80 thus eliminates positive voltage spike due to the discharge of capacitor 132 and provides a low impedance path for charging the capacitor 132 and prevents the voltage of the main power source 30 from appearing across the conducting controlled rectifier 44 while the attempt is being made to shut this controlled rectifier off. The inductor 40 supports the reverse shut-off voltage across the power controlled rectifier 44 thereby assisting in the shut-off action of this controlled rectifier. In addition, the inductor 40 forms part of a series resonant charging circuit.

When the controlled rectifier 100 is triggered to a conductive condition and after controlled rectifier 44 is turned off by the discharge of capacitor 132, the capacitor 132 will be charged positive at junction 114 and negative at junction 56. This charging circuit can be traced from the positive side of shut-off power supply 124, through conductive controlled rectifier 100, through capacitor 132, through diode 80, through inductance 40, and back to the opposite side of the shut-off power supply 124 through junction 126. The circuit just described provides a simple, efficient resonant charging circuit for the commutating capacitor 132.

With capacitor 132 charged positive at junction 114, it is in a condition to turn off power controlled rectifier 50 by discharging through shut-off controlled rectifier 106 when it is triggered conductive. This turn-off circuit will, of course, include the shut-off power supply 128. The discharge current of capacitor 132 will also flow through inductor 42 and diode 82.

The clamping action of diode 82 will now be described during the period that the power controlled rectifier 44 is turned off. In describing this clamping action, the loop circuit which includes diode 82, phase winding 12, phase winding 14, controlled rectifier 52 and inductance 42 will be considered. It can be shown that a negative voltage across phase winding 12 when added to the positive voltages across phase winding 14 and across inductor 42 will equal zero. This being true, the diode 82 will conduct when the voltage across phase winding 12 is greater than the sum of the voltages across phase winding 14 and inductance 42. The collapsing magnetic field in phase winding 12 will cause current to flow through the loop circuit including the phase winding 14, controlled rectifier 52, inductor 42, and diode 82. Since the voltage across phase winding 14 is much greater than the voltage across inductance 42, the diode primarily clamps the voltage of winding 12 to the voltage of winding 14, thus transferring the reactive energy of phase winding 12 to phase winding 14 through the loop circuit. It is preferable to transfer this reactive energy from one motor winding to another rather than to pump it back to the power source and this can be done by use of the diode 82.

The description that has just been set forth can equally be applied to other pairs of controlled rectifiers and diodes of the inverter.

Referring now to FIGURE 3, an inverter is illustrated which is a modified version of the inverter shown in FIGURE 2. In FIGURE 3, the same reference numerals have been used to identify the same corresponding circuit elements as were used in FIGURE 2.

The FIGURE 3 arrangement differs from the FIGURE 2 arrangement in that the inductances 40 and 42 rather than being single inductances have now been split up into six inductances 140, 142, 144, 146, 148 and 150. In addition, the shunt-off power supplies, for example, power supply 152 includes a source of direct current 154, a diode 156, a capacitor 158 and a resistor 160. The other shut-off power supply 162 has the same components as the shut-off power supply 152. One other modification shown in FIGURE 3 is the use of inductors 164, 165, 166, 167, 168 and 169 cause a compromise of the clipping action pairs of shut-off controlled rectifiers and with the commutating capacitors. These inductors are not magnetically coupled.

The inductances 140 through 150 perform the same function as the inductances 40 and 42 shown in FIGURE 2. In FIGURE 2, the trigger to turn-on the following phase was slightly delayed to allow the complete shut-off of the preceding phase. This delay circuit is not required in FIGURE 3. The new coils 164, 165, 166, 167, 168 and 169 cause a compromise of the clipping action of diodes 80, 82, 90, 82, 96 and 98. This spike voltage that is now allowed to appear across the motor winding and hence across a non-conducting SCR is maintained low and is determined by the ratio of inductance between inductors 164 compared to 140.

The inductors 164, 165, 166, 167, 168 and 169 are also used to limit the rate of change of current flow through the shut-off controlled rectifiers.

While the embodiments of the present invention as herein disclosed constitute a preferred form, it is to be understood that other forms might be adopted.

What is claimed is as follows:

1. An inverter comprising, a pair of input conductors adapted to be connected wih a source of direct current, a plurality of pairs of power controlled rectifiers series connected across said input conductors, each pair of power controlled rectifiers being connected with an output terminal, first and second conductors energized respectively from shut-off power supplies, a plurality of pairs of shut-off controlled rectifiers series connected across said conductors connnected with a junction, a commutating capacitor connected between each output terminal of said pairs of power controlled rectifiers and each junction of said pairs of shut-off controlled rectifiers, and a diode connected across each power controlled rectifier, said diode being poled in such a direction as to form a bypass circuit for the discharge current of a commutating capacitor around the anode-cathode circuit of a respective power controlled rectifier.

2. An inverter comprising, input terminals adapted to be connected with a source of direct currrent, a plurality of output terminals adapted to be connected with an electrical load, first and second conductors, a plurality of pairs of power controlled rectifiers connected across said input terminals, each of said pairs of power controlled rectifiers being connected with one of said output terminals, a plurality of pairs of shut-off controlled rectifiers series connected across said first and second conductors, each of said pairs of shut-off controlled rectifiers having a junction, a plurality of commutating capacitors, said capacitors being connected respectively between one of said output terminals and one of said junctions, first and second shut-off power supplies, means connecting each shut-off power supply respectively between an input conductor and said first and second conductors, a plurality of diodes, and a circuit connecting each of said diodes across a respective power controlled rectifier, each of said circuits including an inductance.

3. A power supply system for a three phase electrical load comprising, a source of direct current, a three phase load, an inverter having a pair of input conductors connected with said source of direct current and having three output terminals connected with said three phase load, first and second conductors, a plurality of pairs of power controlled rectifiers series connected across said input conductors, each pair of power controlled rectifiers being connected with one of said output terminals, a plurality of pairs of shut-off controlled rectifiers series-connected across said first and second conductors, each pair of shut-off controlled rectifiers being connected with a junction, a plurality of commutating capacitors connected respectively between said output terminals and said junctions, first and second shut-off power supplies, means connecting said first shut-off power supply between one of said input conductors and said first conductor, means connecting said second shut-off power supply between the other of said input conductors and said second conductor, inductor means, a plurality of diodes, and means connecting each of said diodes and said inductor means across a respective power controlled rectifier, said diode and said inductor means providing part of a discharge path for a respective communicating capacitor when one of said shut-off controlled rectifiers is triggered to a condition.

4. The electrical system according to claim 3 where the three phase load is an electric motor having a three phase Y-connected winding.

5. A power supply system for a polyphase electric motor having a polyphase winding comprising, a source of direct current, a pair of power supply conductors connected with opposite ends of said source of direct current, an inverter, said inverter including a plurality of pairs of power controlled rectifiers connected across said power supply conductors, a junction intermediate each pair of power controlled rectifiers connected respectively with the phase windings of said motor and providing AC output terminals for said inverter, a commutating capacitor, a plurality of pairs of shut-off controlled rectifiers, a series connected inductor and diode connected directly across the anode and cathode of each power controlled rectifier, and a shut-off circuit for shutting off a given power controlled rectifier connected across said commutating capacitor including one of said shut-off controlled rectifiers, said capacitor discharging through said shut-off circuit, said series connected inductor and diode forming another current path shunting said power controlled rectifier for the discharging of said commutating capacitor when said shut-off controlled rectifier is triggered to a conductive condition, another of said series connected diode and inductors forming a conductive path for reactive energy developed in a phase winding of said motor when said power controlled rectifier is turned off, said conductive path including a power controlled rectifier.

References Cited

UNITED STATES PATENTS

| | | | |
|---|---|---|---|
| 2,912,634 | 11/1959 | Peoples | 321—5 |
| 3,103,616 | 9/1963 | Cole et al. | 321—45 |
| 3,176,211 | 3/1965 | Linn | 321—5 |
| 3,181,053 | 4/1965 | Amato | 321—45 |
| 3,262,036 | 7/1966 | Clarke et al. | 318—227 X |
| 3,280,396 | 10/1966 | Beck et al. | 318—138 |

ORIS L. RADER, *Primary Examiner.*

G. RUBINSON, *Assistant Examiner.*

UNITED STATES PATENT OFFICE
CERTIFICATE OF CORRECTION

Patent No. 3,354,370                      November 21, 1967

Thomas M. Corry et al.

It is hereby certified that error appears in the above numbered patent requiring correction and that the said Letters Patent should read as corrected below.

Column 1, line 57, for "which has a high Q commutating" read -- wherein the reactive energy of --; column 2, line 46, for "numeras" read -- numerals --; line 54, for "conductor" read -- conductors --; column 4, line 72, for "shunt-off" read -- shut-off --; column 5, line 3, for "cause a compromise of the clipping action" read -- which are connected respectively between --; line 14, for "82", second occurrence, read -- 92 --.

Signed and sealed this 31st day of December 1968.

(SEAL)
Attest:

Edward M. Fletcher, Jr.                      EDWARD J. BRENNER
Attesting Officer                              Commissioner of Patents